(12) United States Patent
Kemp (10) Patent No.: US 9,881,155 B2
(45) Date of Patent: Jan. 30, 2018

(54) SYSTEM AND METHOD FOR AUTOMATIC USE-AFTER-FREE EXPLOIT DETECTION

(71) Applicant: Leviathan, Inc., Seattle, WA (US)

(72) Inventor: Darren Kemp, Calgary (CA)

(73) Assignee: Leviathan, Inc., Seattle, WA (US)

( * ) Notice: Subject to any disclaimer, the term of this patent is extended or adjusted under 35 U.S.C. 154(b) by 48 days.

(21) Appl. No.: 14/791,052

(22) Filed: Jul. 2, 2015

(65) Prior Publication Data

US 2016/0006759 A1 Jan. 7, 2016

Related U.S. Application Data

(60) Provisional application No. 62/020,286, filed on Jul. 2, 2014.

(51) Int. Cl.
| | |
|---|---|
| G06F 7/04 | (2006.01) |
| G06F 21/55 | (2013.01) |
| H04L 29/06 | (2006.01) |
| G06F 11/07 | (2006.01) |

(52) U.S. Cl.
CPC ............ *G06F 21/554* (2013.01); *G06F 11/07* (2013.01); *H04L 63/14* (2013.01); *H04L 63/1408* (2013.01)

(58) Field of Classification Search
CPC ............. H04L 63/1414; H04L 63/1408; H04L 63/1441; H04L 63/1466; G06F 11/07; G06F 11/0778; G06F 11/079
See application file for complete search history.

(56) References Cited

U.S. PATENT DOCUMENTS

| | | | | |
|---|---|---|---|---|
| 2009/0320136 A1* | 12/2009 | Lambert | ............... | G06F 21/554 726/25 |
| 2014/0344633 A1* | 11/2014 | Li | ....................... | G06F 11/3604 714/57 |

* cited by examiner

*Primary Examiner* — Ali Abyaneh
*Assistant Examiner* — Shaqueal Wade
(74) *Attorney, Agent, or Firm* — Vernon Francissen (57) ABSTRACT

Systems, methods and media are shown for automatically detecting a use-after-free exploit based attack that involve receiving crash dump data relating to a fault event, determining whether the fault event instruction is a call type instruction and, if so, identifying a UAF attack by checking whether it includes a base address in a first register that stores a pointer to free memory and, if so, generating a UAF alert. In some examples, generating a use-after-free alert includes automatically sending a message that indicates a UAF attack or automatically triggering a system defense to the UAF attack. Some examples may include, for a call type faulting instruction, identifying a UAF attack, checking whether a base address in the first register includes a pointer in a second register to a free memory location associated with the base address.

9 Claims, 5 Drawing Sheets

SYSTEM AND METHOD FOR AUTOMATIC USE-AFTER-FREE EXPLOIT DETECTION

CROSS REFERENCE TO RELATED APPLICATIONS

This application claims the benefit of U.S. Provisional Patent Appl. No. 62/020,286 for "System and Method for Automatic Use-After-Free Exploit Detection" filed Jul. 2, 2014, herein incorporated by reference in its entirety for all purposes.

GOVERNMENT LICENSE RIGHTS

This invention was made with government support under FA8750-12-C-0161 awarded by the United States Air Force. The government has certain rights in this invention.

BACKGROUND

Computer networks and the devices and services that reside on them are often the subject of attacks by parties that are attempting to improperly access information and resources or to introduce malicious code to the networks. The attackers who are threats to information technology infrastructure assets and to the confidentiality of information stored in them may come from a wide variety of different sources, with different motives, levels of sophistication, available resources, and expertise.

SUMMARY

In accordance with certain aspects of the present invention, a process and system are shown for automatically detecting a use-after-free exploit based attack that includes receiving crash dump data relating to a fault event and determining whether an instruction that caused the fault event is a call type instruction. If the faulting instruction is a call type instruction, the process calls for identifying a use-after-free attack by checking whether the faulting instruction includes a base address in a first register and the first register has stored therein a pointer to a portion of memory whose status is free and generating a use-after-free alert if a use-after-free attack is identified. A further refinement of the process and system involves, if the faulting instruction is a call type instruction, identifying a use-after-free attack by checking whether the faulting instruction includes a base address in the first register and includes a pointer in a second register that points to a memory location associated with the base address, where a status of the memory location is free. In another refinement of the process and system, generating a use-after-free alert involves generating a use-after-free exploit factor data as input to a heuristic including multiple exploit detection factors including the use-after-free exploit factor.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
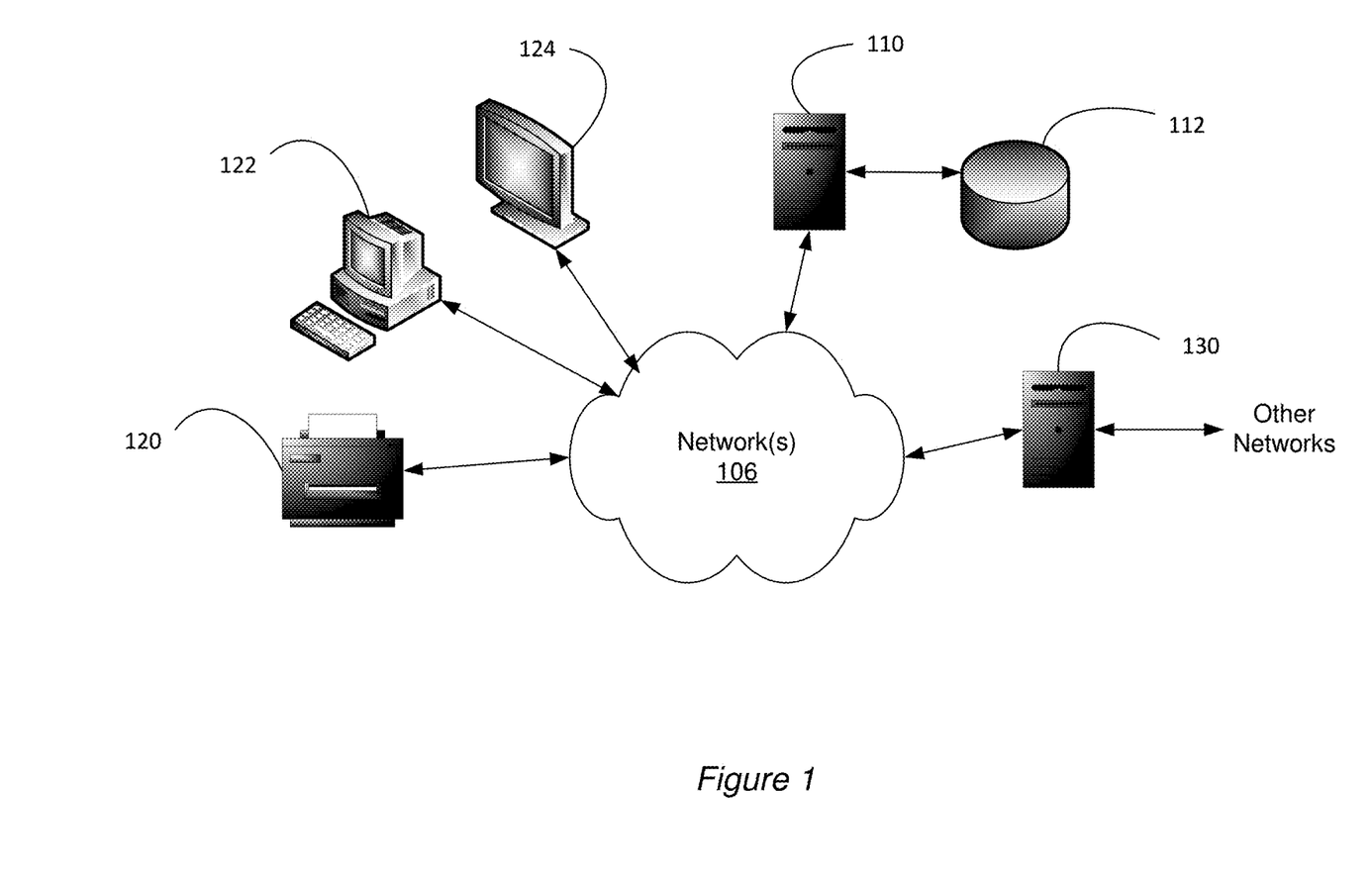
FIG. 1 is a schematic diagram depicting an example of a computer network based system that may be subject to attack and may be suitable for utilization of certain aspects of the present invention.

FIG. 1 is an architecture diagram that depicts aspects of an example of a computer network system with communication among multiple devices. In this example, network 106, which can be one network or multiple networks, provides communication between server 110 connected to database 112 and several client devices, such as printer 120, personal computer 122, and interactive terminal 124. The architecture of FIG. 1 is a simplified representation of an enterprise environment having a multitude of different computing devices that may represent a target for an attack. A gateway 130 provides a communications link between the network 106 and other networks, such as the internet, through which an attacker may launch an attack. The open nature of computer networks exposes code vulnerabilities that are frequently targeted for attack by hackers and malicious actors to gain improper access to systems.

Referencing memory after it has been freed can cause a program to crash, use unexpected values, or execute code. For example, a segment of memory allocated to a first pointer may be validly allocated to a second pointer at some point after the memory segment has been freed. Then the first pointer to the freed memory is used again and points to a location within the new allocation to the second pointer. As the data in the memory segment indexed by the first pointer is changed, the validly allocated memory is corrupted, which induces undefined behavior in the process that may be exploited to take control of a machine that is the subject of an attack. For example, if the newly allocated data happens to hold a C++ class, then various function pointers may be scattered within the head data. If one of these function pointers is overwritten with an address to valid shellcode, then execution of arbitrary code may be achieved.

Figure 2:
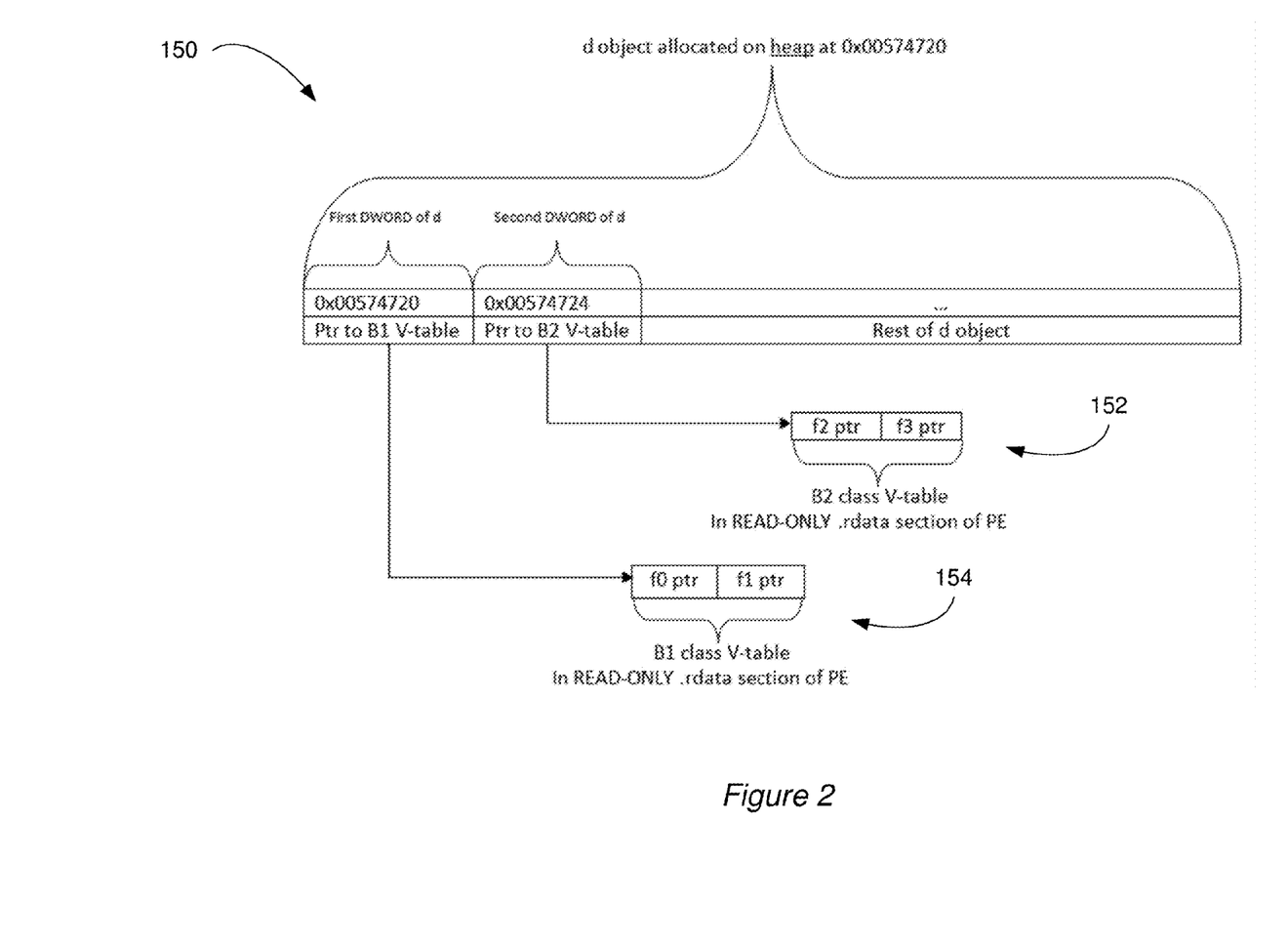
FIG. 2 is a schematic diagram illustrating an example of a V-table structure.

FIG. 2 is a graphical depiction of an example of a heap showing a relationship between an object d 150 allocated on the heap at address 0x00574720 and V-tables 152 and 154 that object d references. The first Dword of the d object 150 points to a B1 class V-table 154 that resides in a read-only .rdata section of memory and includes pointers to functions f0 and f1. The second Dword of object d 150 points to a B2 class V-table 152 that also resides in the read-only .rdata section of memory and includes pointers to functions f2 and f3.

Figure 3:
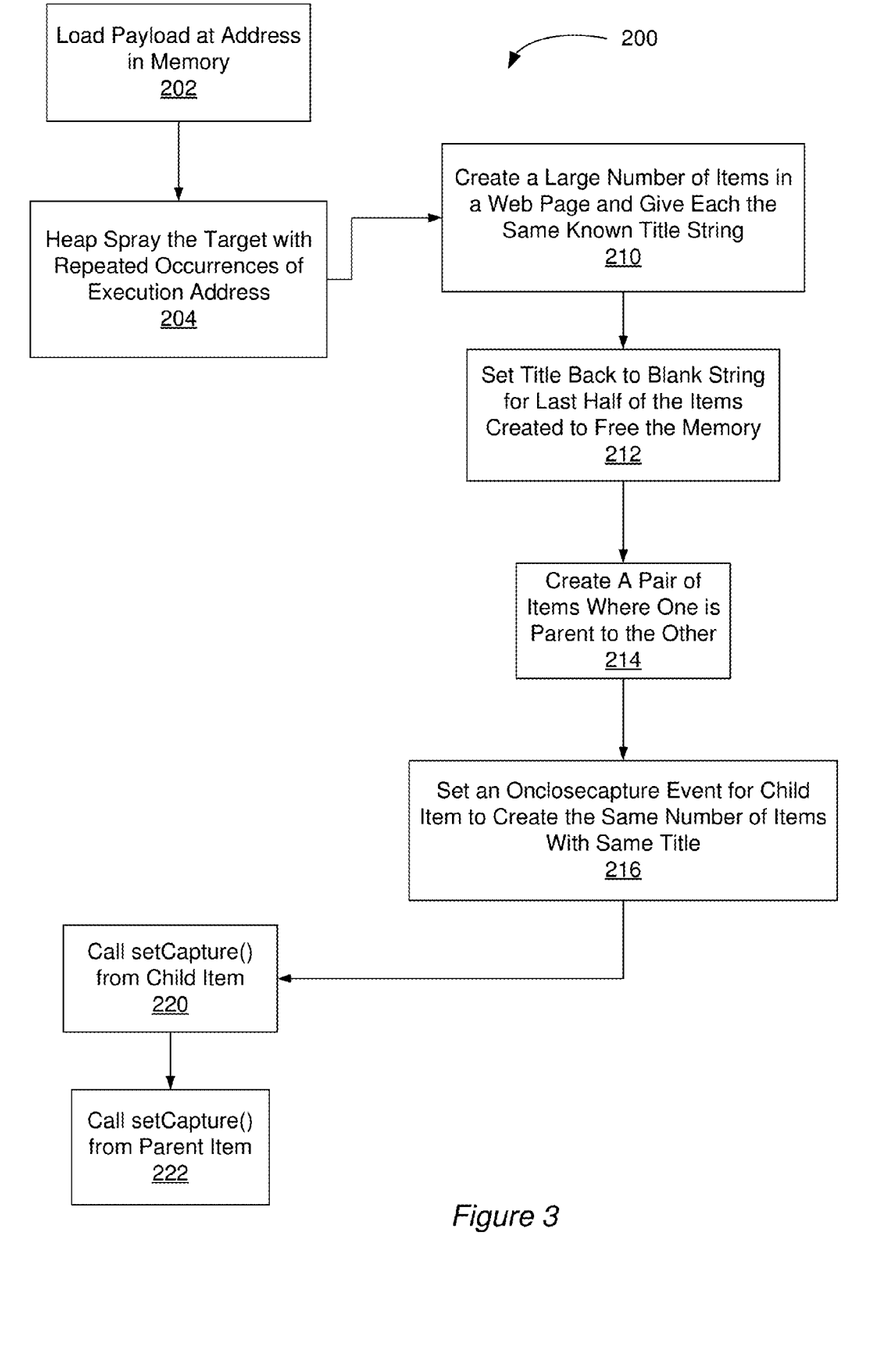
FIG. 3 is a schematic diagram illustrating an example of a V-Table based attack on the V-table structure of FIG. 2.

In this example, in order to use a V-table pointer overwrite exploit to hijack a call to d->f1( ) a "fake V-table" and attacker code must be in place in memory before executing the call. For this example, assume the "fake V-table" is at 0xDEADBEEF and the attacker code is at 0x41414141. This can be achieved by memory spraying to establish the following: 1) Address 0xDEADBEEF has already been allocated and is readable; 2) The DWORD at 4 bytes past 0xDEADBEEF, e.g. 0xDEADBEF3, is the address of attacker code that the exploit is trying to execute; and 3) the attacker code exists at 0x41414141. The exploit is to overwrite the pointer, which is stored in the heap-allocated object, to the B1 class V-table 154 with the value 0xDEAD-BEEF. Here, the pointer to the B1 V-table, which is stored at 0x00574720, is overwritten with the value 0xDEAD-BEEF. FIG. 3 illustrates the resulting overwritten V-table pointers with sprayed fake V-table 170 and attacker code 172. (See http://neilscomputerblog.blogspot.com/2013/02/attacking-v-table-pointers.html for further details relating to this example.)

FIG. 3 is a control flow diagram illustrating an example of a process 200 for exploiting a use-after-free vulnerability, i.e. the Internet Explorer UAF vulnerability CVE-2013-3893, that exploits the ability of a JavaScript object to take or relinquish control over mouse events in a browser window using the functions setCapture( ) and releaseCapture( ). At step 202, a malicious payload is stored at a known address in memory. At step 204, the target device is heap sprayed with the execution address of the payload in step 202. In order to create the freed memory to be used in the use-after-free exploit, at step 210, a large number of items are created in the web page used for the exploit all having the same known title string. At step 212, the title for many of the items created in step 210 is set back to a blank string in order to free the memory for those items. At step 214, two items are created with a parent-child relationship. At step 216, an Onclosecapture event is set for the child item to create the same large number of items as in step 210 with the same known title as used in step 210. At step 218, the target is heap sprayed with the payload execution address, e.g. large blocks of data containing repeated instances of the execution address. At step 220, the setCapture( ) function is called from the child item created at step 214. At step 222, setCapture( ) is called from the parent item, which causes the Onclosecapture( ) event created at step 216 to be called in the child item.

The steps 210 and 216 permit the attacker to control the content of a register ECX in the processor and cause an exception to occur when system library MSHTML.DLL tries to run the instruction MOV EDX, [ECX], which causes the processor to fetch the value at the memory address stored in ECX and store it in register EDX. This instruction is following in code by the instructions MOVE EAX, [EDX+C4] and CALL EAX, which fetches the contents of the address C4 bytes beyond the address in ECX and calls it as a subroutine. This causes an exception to occur because there is no memory allocated at the address location indicated by the ASCII value of the title used in the steps 212 and 216.

The memory that was freed at step 212 was re-used by Internet Explorer to store data that control the flow of execution in MSHTML.DLL and then wrongly re-used again for saving the text strings created at step 216 giving rise to a use-after-free (UAF) vulnerability. The UAF vulnerability is used by the attackers to cause the browser to use untrusted data from the attackers' web page to jump to the next location in memory. The attackers are thus able to execute their malicious payload at the heap spray address of step 204 using this UAF vulnerability.

At step 220, the child item calls setCapture( ) followed by step 222, which calls setCapture( ) from the parent item, which causes the onclosecapture( ) event from step 216 to be called in the child item. This causes execution to load the contents of an address in memory with the goal that the address might be one of the locations populated by the heap spray from step 204, which contains the execution address of the payload introduced at step 202. The memory freed up at step 212 is re-used by the Internet Explorer browser application to store data that controls the flow of execution in the rendering engine, mshtml.dll, and then re-used again for saving the texts strings created in step 216, i.e. the name "user-after-free". The attacker can thus gain remote code execution on the targeted device.

Use-after-free (UAF), denoting a scenario in which a block of memory reported to the operating system as no longer in use continues to be used by the executing program for the purpose for which it was originally allocated, is a common software vulnerability. In particular, if an attacker can cause the same region of memory to be reallocated for some other purpose that allows an attacker to influence the contents of that memory, or to influence the contents of that memory after it has been freed, than there exists an exploitable software vulnerability. In particular, an attacker may overwrite a segment of memory that was previously allocated in such a way that it should be interpreted as a list of offsets of functions to which execution may be branched (e.g. a jump table or vtable) and then cause the program to use that data (e.g. by calling a method in a freed object). This scenario can be detected in the program state as the branch occurs because the address to which execution will branch will be contained within a region of memory marked as being not currently in use. It is possible to infer an exploitable software bug, and to a limited degree, evidence of that bug being exploited, where this scenario exists.

If a UAF vulnerability exists in an application and an attacker is attempting to exploit it, then the exploit may fail because the address that the attacker attempted to redirect execution to is incorrect or invalid, e.g. a program call that causes a fault. The fault will typically cause a crash dump to be generated indicating that the application faulted on a call instruction, using a particular register as the base address (e.g. a vtable call, as a call to an array of pointers, is generally of the form base+index*displacement). Generally, in memory, there will also be a pointer to the object in which a method is being called.

The presence of a UAF exploit may be inferred from two conditions. First, if the faulting instruction is a call with the base address in a register, and that register contains a pointer to a chunk of memory that is marked as free on the heap, then a UAF exploit event is indicated. Secondly, if the faulting instruction is a call with the base address in a register, and in some other register is a pointer to a memory location containing this base address (e.g. the second register points to the object being dereferenced, the first component of which is a vtable address), then a vtable call may be inferred. If the object pointer in the second register also points to a free region on the heap, then the object whose vtable is being called has been deleted. A UAF exploit is indicated because the program faulted when it was attempting to execute a method on an object that resides in memory that is marked as free.

One aspect of the present invention involves checking the values of registers in a snapshot of program state, such as a crash dump, against a list of memory regions to determine whether any registers are acting as pointers to a jump table residing in a block of memory that is marked as free. Another aspect of the present invention involves checking the offset in memory of the base address of a function call to a jump table against a list of memory regions to determine whether the base of that jump table resides within a block of memory that is marked as free. Yet another aspect of the present invention involves inferring the existence or exploitation of a software vulnerability from the existence of pointers into blocks of memory marked free or from the use of operands to branch instructions located within blocks of memory marked free, or the use of this data as input to a heuristic comprised of this and other factors.

Figure 4:
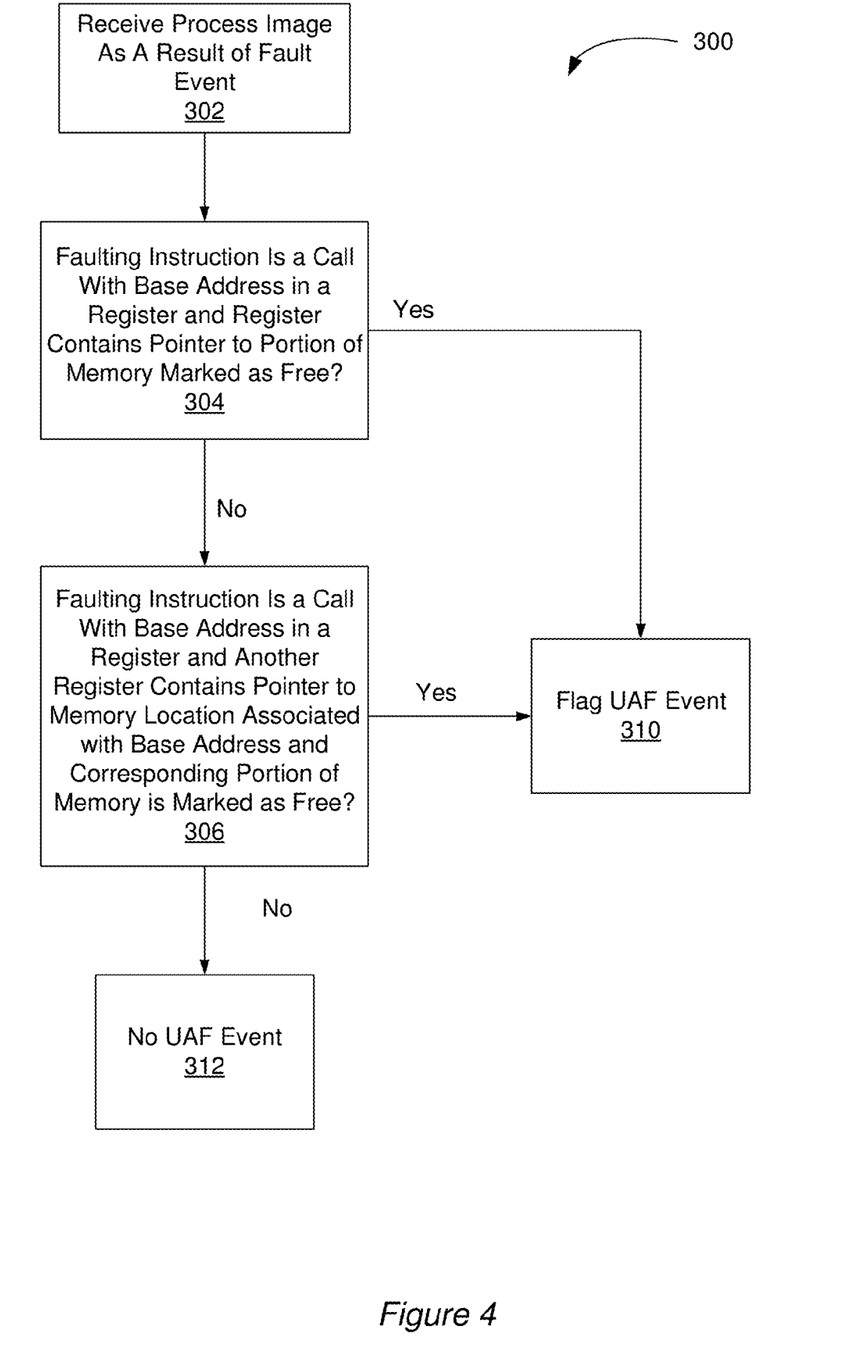
FIG. 4 is a control flow diagram illustrating one example of a process for automatically detecting a V-table based attack in accordance with certain aspects of the present invention.

FIG. 4 is a control flow diagram illustrating one example of a process 300 for processing a crash dump to detect an attempted UAF exploit based attack in accordance with certain aspects of the present invention. At step 302, a crash dump for a fault event is received and is analyzed. The crash dump data may be reverse assembled or similarly processed such that the code instructions in the crash dump are recovered along with their parameters, e.g. pointers, base address, branch with destination address or index.

At step 304, the instruction that caused the fault event is analyzed to determine if it is a call instruction with a base address in a register and the register contains a pointer to a portion of memory that is marked as free on the heap. If it is, then the fault event is highly likely to have been caused by a UAF exploit attempt and control branches to step 310 to flag the event for action or further analysis. The alert may be used to automatically send a message to a network administrator, such as an email with the crash dump data, the reverse compiled code and text indicating the type of attack and the code module or instruction that faulted. The alert may be used to automatically trigger system defenses to respond to the attack, such as limiting or blocking access to the vulnerable code module. The alert may be used for a variety of responses.

If not, then control branches to step 306, where the faulting instruction is analyzed to determine if it is a call instruction using a base address in a register and another register contains a pointer to a memory location associated with the base address and that the corresponding memory portion is marked as free on the heap. If so, then this fault is highly likely to have been the result of a UAF exploit attempt and control branches to step 310. If not, then a UAF event is unlikely and control branches to step 312 with no alert.

In accordance with at least one embodiment of the invention, the system, apparatus, methods, processes and/or operations described herein may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system. In accordance with another embodiment of the invention, the system, apparatus, methods, processes and/or operations described herein may be wholly or partially implemented in the form of a set of processor executable instructions stored on persistent storage media.

Figure 5:
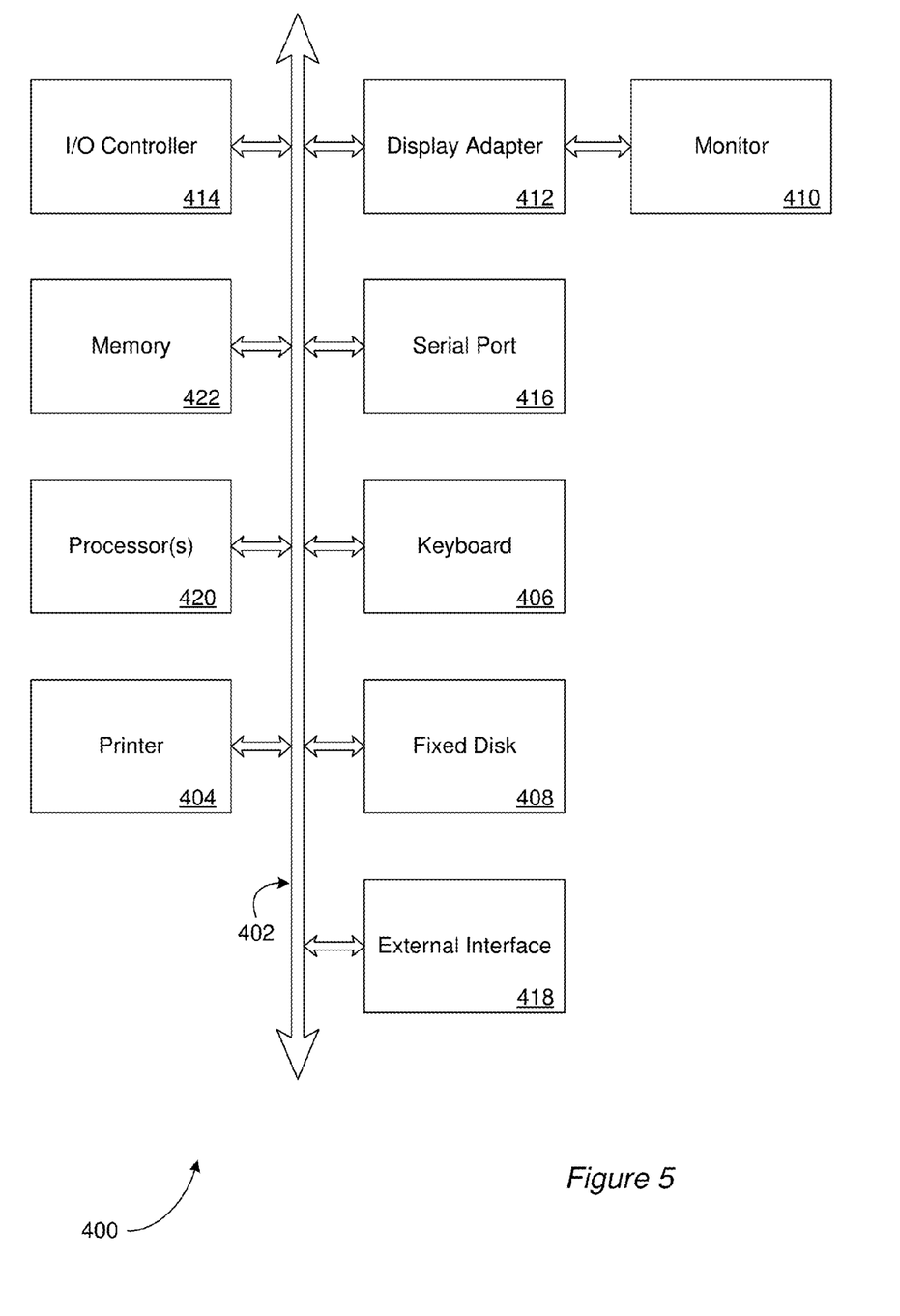
FIG. 5 depicts aspects of elements that may be present in a computer device and/or system configured to implement a method, system and/or process in accordance with certain aspects of the present invention.

FIG. 5 depicts aspects of elements that may be present in one example of a computer device and/or system 400 configured to implement at least some elements of a method, system and/or process in accordance with some embodiments of the present invention. The subsystems shown in FIG. 5 are interconnected via a system bus 402. Additional subsystems include a printer 404, a keyboard 406, a fixed disk 408, and a monitor 410, which is coupled to a display adapter 412. Peripherals and input/output (I/O) devices, which couple to an I/O controller 414, can be connected to the computer system by any number of means known in the art, such as a serial port 416. For example, the serial port 416 or an external interface 418 can be utilized to connect the computer device 400 to further devices and/or systems not shown in FIG. 5 including a wide area network such as the Internet, a mouse input device, and/or a scanner. The interconnection via the system bus 402 allows one or more processors 420 to communicate with each subsystem and to control the execution of instructions that may be stored in a system memory 422 and/or the fixed disk 408, as well as the exchange of information between subsystems. The system memory 422 and/or the fixed disk 408 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components or steps depicted in the drawings or described above, as well as components and steps not shown or described, are possible without departing from the scope of the invention. Similarly, some features and subcombinations are useful and may be employed without reference to other features and subcombinations. Embodiments of the invention have been described for illustrative and not restrictive purposes, and alternative embodiments will be apparent to one of ordinary skill in the art. Accordingly, the present invention is not limited to the embodiments described above or depicted in the drawings, and various embodiments and modifications can be made without departing from the scope of the invention.

I claim:

1. A method for automatically detecting a use-after-free exploit based attack, the method including the steps:
   receiving crash dump data relating to a fault event;
   determining whether an instruction that caused the fault event is a call type instruction;
   when the faulting instruction is the call type instruction, identifying a use-after-free attack by checking whether the faulting instruction includes a base address in a first register and the first register has stored therein a pointer to a portion of memory whose status is free, and
   when no use-after free attack is identified by checking whether the faulting instruction includes the base address in the first register and the first register has stored therein the pointer to the portion of memory whose status is free, identifying the use-after-free attack by checking whether the faulting instruction includes the base address in the first register and includes the pointer in a second register that points to a memory location associated with the base address, where a status of the memory location is free; and
   when the use-after-free attack is identified, generating a use-after-free alert.

2. The method for automatically detecting the use-after-free exploit based attack of claim 1, where the step of generating the use-after-free alert includes at least one of the steps of:
   automatically sending a message to a network administrator that indicates the use-after-free attack; and
   automatically triggering a system defense to respond to the use-after-free attack.

3. The method for automatically detecting the use-after-free exploit based attack of claim 1, where the step of generating the use-after-free alert further includes inputting the use-after-free alert to a heuristic including multiple exploit detection factors.

4. A system for automatically detecting a use-after-free exploit based attack, the system including:
   at least one processor; and
   at least one memory device in communication with the processor, the memory device having stored therein computer readable instructions that, when executed by the processor, cause the processor to perform the following operations:
   receiving crash dump data relating to a fault event;
   determining whether an instruction that caused the fault event is a call type instruction;
   when the faulting instruction is the call type instruction, identifying a use-after-free attack by checking whether the faulting instruction includes a base address in a first register and the first register has stored therein a pointer to a portion of memory whose status is free, and
   when no user-after free attack is identified by checking whether the faulting instruction includes the base address in the first register and the first register has stored therein the pointer to the portion of memory whose status is free, identifying the use-after-free attack by checking whether the faulting instruction includes the base address in the first register and includes the pointer in a second register that points to a memory location associated with the base address, where a status of the memory location is free; and
   when the use-after-free attack is identified, generating a use-after-free alert.

5. The system for automatically detecting the use-after-free exploit based attack of claim 4, where the instructions for generating the use-after-free alert include instructions for at least one of:
   automatically sending a message to a network administrator that indicates the use-after-free attack; and
   automatically triggering a system defense to respond to the use-after-free attack.

6. The system for automatically detecting the use-after-free exploit based attack of claim 4, where the instructions for generating the use-after-free alert further include instructions for inputting the use-after-free alert to a heuristic including multiple exploit detection factors.

7. A non-transitory persistent computer readable medium storing computer code configured to a cause a processing device to operate to automatically detect a use-after-free exploit based attack, the computer code including instructions that configure the processing device to:
   receive crash dump data relating to a fault event;
   determine whether an instruction that caused the fault event is a call type instruction;
   when the faulting instruction is the call type instruction, identify a use-after-free attack by checking whether the faulting instruction includes a base address in a first register and the first register has stored therein a pointer to a portion of memory whose status free, and
   when no user-after free attack is identified by checking whether the faulting instruction includes the base address in the first register and the first register has stored therein the pointer to the portion of memory whose status is free, identifying the use-after-free attack by checking whether the faulting instruction includes the base address in the first register and includes the pointer in a second register that points to a memory location associated with the base address, where a status of the memory location is free; and
   when the use-after-free attack is identified, generate a use-after-free alert.

8. The persistent computer readable medium of claim 7, where the instructions that configure the processing device to generate the use-after-free alert includes instructions for at least one of operations to:
   automatically send a message to a network administrator that indicates the use-after-free attack; and
   automatically trigger a system defense to respond to the use-after-free attack.

9. The persistent computer readable medium of claim 7, where the instructions that configure the processing device to generate the use-after-free alert further include instructions that configure the processing device to input the use-after-free alert to a heuristic including multiple exploit detection factors.

* * * * *